United States Patent [19]

Jacobson

[11] Patent Number: 4,936,149
[45] Date of Patent: Jun. 26, 1990

[54] INTERNAL STRAIN MEASURING SYSTEM

[75] Inventor: Walter E. Jacobson, Meriden, Conn.

[73] Assignee: Revere Corporation of America, Wallingford, Conn.

[21] Appl. No.: 364,197

[22] Filed: Jun. 8, 1989

[51] Int. Cl.$^5$ .............................................. G01L 1/22
[52] U.S. Cl. ..................................... 73/768; 73/862.65
[58] Field of Search ............ 73/768, 786, 783, 862.65, 73/862.67, 862.66

[56] References Cited

U.S. PATENT DOCUMENTS 4,530,245  7/1985  Jacobson .............................. 73/768
4,738,135  4/1988  Cadwell et al. ...................... 73/786

Primary Examiner—Jerry W. Myracle
Attorney, Agent, or Firm—McCormick, Paulding & Huber

[57] ABSTRACT

A flat disc is pressed into a bore provided in a structural member that is under stress. The disc has peripheral teeth that permit to be press fit in the bore and strain gage elements oriented mutually perpendicularly to one another provide inputs to a bridge circuit for monitoring the strain in the member at a preselected location.

20 Claims, 2 Drawing Sheets

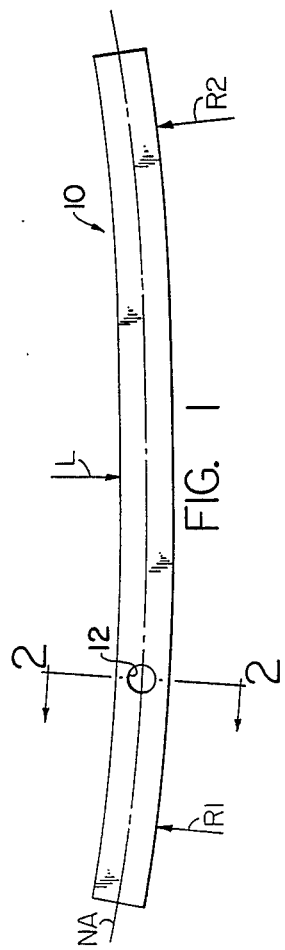
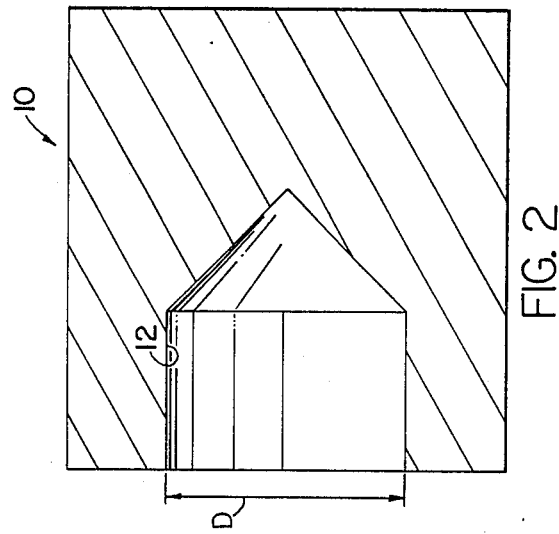
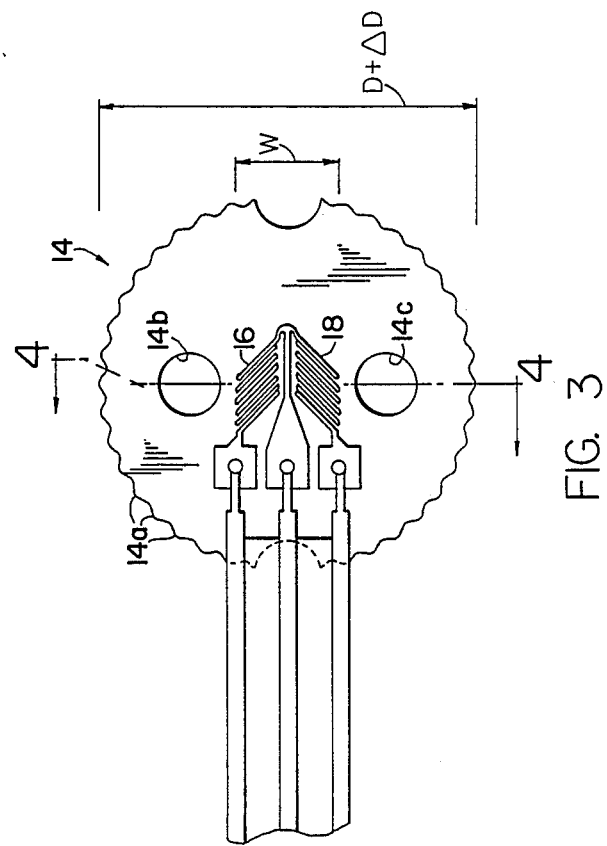

INTERNAL STRAIN MEASURING SYSTEM

This invention relates generally to the monitoring of internal strains within a structural member, and provides a method for measuring such strains after a bore is formed in the member.

BACKGROUND OF INVENTION

Transducers of the type adapted to be inserted in such a bore are suggested in the prior art. For example, U.K. Pat. No. 2,050,624 shows a cylindrical plug provided with a transversely extending diaphragm wall on one end of the plug. Strain gages are provided on the wall, and an enclosure is provided for the circuitry required to monitor incremental changes in the resistivity of the strain gages.

U.S. Pat. No. 4,530,245 also shows a transducer adapted to be inserted in a hole or bore within a structural member, and in this prior art apparatus the strain gages are also provided in a protective enclosure albeit the signals from the strain gages are carried outside of the immediate vicinity of the transducer to be incorporated in a conventional bridge circuit.

SUMMARY OF INVENTION

The present invention provides an improved method and apparatus for quantitatively determining changes in the internal strain within a structural member such as a beam and comprises; first, forming a cylindrical bore in the member, so that the center line of the bore is on the neutral axis or neutral plane of the member or beam providing a generally cylindrical disc with strain gages bonded to at least one surface of this disc, and then pressing the disc into the bore so that the strain gages are located intermediate the inner and outer ends of the bore. The disc preferably has at least one and preferably two weakening holes to facilitate deformation of the disc in response to strains within the structural member. The output from the strain gages is provided to a conventional bridge circuit for producing an electrical output proportional to changes in the impedance of the strain gages means. The general object of the present invention is to provide a simple less expensive strain gage transducer of the type adapted to be provided in a hole or bore formed in a structural member.

Rather than providing a shell like structure of the type suggested in the prior art the present invention provides for a transducer having a simple disc shape with external teeth formed in its periphery to facilitate pressing of the disc into the bore of the structural member and to provide for deformation or strain of the disc in direct proportion to the deformation or strain of the structural member.

BRIEF DESCRIPTION OF DRAWINGS

FIG. 1 is a schematic view illustrating a structural member 10 under load, and illustrating a possible location 12 for practicing the method of the present invention.

FIG. 2 is a sectional view taken generally on a line 2—2 of FIG. 1 and illustrates a first step in connection with practicing a method of the present invention.

FIG. 3 is a plan view of a generally cylindrical disc formed in accordance with the present invention.

DETAILED DESCRIPTION

Figure 5:
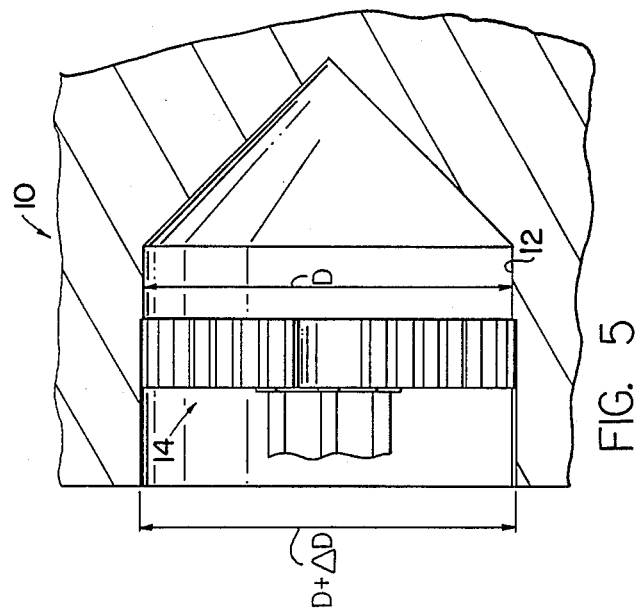
FIG. 5 is an enlarged view of the structure illustrated in FIG. 2 but with the disc pressed into the bore intermediate the bores inner and outer ends.
Figure 4:
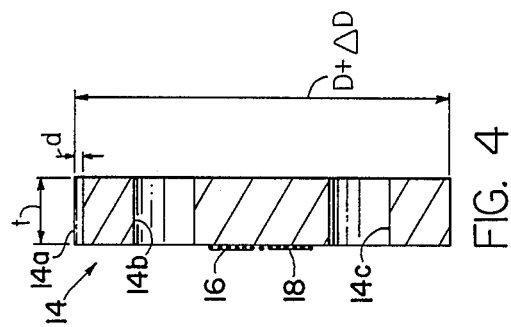
FIG. 4 is a sectional view taken generally on the line 4—4 of FIG. 3.

Turning now to the drawings in greater detail, FIG. 1 shows in schematic fashion a beam 10 supported adjacent its ends and supporting a load L, which load is reacted at the supports by forces R1 and R2. R1 and R2 together total the imposed load L. In accordance with the present invention a method is disclosed for quantitatively determining changes in the internal strain within such a structural member. The following method can be accomplished either before imposing the load L to provide inputs to a bridge circuit for producing an electrical output proportional to the strains realized in the member as a direct result of the load L, or if the bore be formed after load L is imposed to record changes in the impedance of the strain gage means, which changes are directly proportional to changes in the strains and stresses of the beam 10 due to changes in the initial load condition of the beam.

In accordance with the present invention a location on the neutral axis of the beam is selected, such as that indicated generally at 12, where the stresses are not necessarily at a maximum for a particular beam load condition and at this location 12 a cylindrical bore is formed in the member as suggested in FIG. 2.

This bore has a diameter D that is dictated in part by the size of the beam to be monitored, and in part by the size required for the transducer to be described.

In further accordance with the present invention a generally cylindrical disc 14 is formed with a diameter D plus delta D and with a thickness t, and circumaxially spaced teeth 14a, 14a are formed in the periphery of the disc such that adjacent teeth define a valley therebetween of depth d such that the ratio D over d (of the bore diameter D to the tooth depth d of such valleys) is in the range of 10–100, and is preferably on the order of 50–70. These teeth are equally spaced circumaxially in the disc periphery and define a pitch between adjacent teeth in the range of 0.1 D to 0.05 D. More specifically, with a disc fabricated from hardened stainless steel the depth d is preferably on the order of 0.01 inches, and may be somewhat greater depending upon the material from which the beam itself is fabricated.

These teeth 14a, 14a preferably define a pitch in said range of 0.1 D to 0.05 D and a pitch of approximately 0.04 inches has been found satisfactory. The disc is preferably located intermediate the inner and outer ends of the bore 12. The disc preferably includes at least one and preferably two holes 14b and 14c each of which holes is provided on a common diameter (section line 4—4) of the disc. The holes are provided with a space between them that is suitable for receiving at least one and preferably two strain gage elements 16 and 18 which strain gage elements are conventionally coupled to a bridge circuit (not shown) to provide an electrical output proportional to changes in the impedance of the strain gage means as a result of strains transferred from the beam to the disc across the disc periphery.

Turning next to a further discussion of disc geometry the disc diameter D plus delta D (D + Δ D) is at least approximately equal to the diameter D of the bore plus the depth d of the teeth formed in the disc periphery so that delta D is at least approximately equal to d. Furthermore, the holes 14b and 14c are preferably of equal diameter and have a diameter that is equal to the thickness t of the disc itself. Furthermore, the ratio of the width W, for the space available for mounting the strain gages 16 and 18, is preferably twice the thickness t of the disc. The strain gages are preferably oriented at 90 degrees with respect to one another and so that the orientation of the strain gage wires is provided at a bias to the diameter defined by section line 4—4. This geometry provides reliable indications of tension, compression, and shear stresses.

I claim:

1. A method for quantitatively determining changes in the internal strain within a structural member and comprising:
   (a) forming a cylindrical bore in the member, which bore has a diameter D,
   (b) forming a generally cylindrical disc of diameter D plus D, and forming circumaxially spaced teeth in disc periphery said teeth forming valleys therebetween,
   (c) bonding electric strain gage means on at least one surface of the disc,
   (d) pressing the disc into the bore so that the strain gage means is located intermediate the inner and outer ends of the bore,
   (e) providing at least one hole in the disc so that the disc can be compressed on a disc diameter through the hole,
   (e) providing at least one hole in the disc so that the disc can be compressed on a disc diameter through the hole,
   (f) providing the strain gage means as input to a bridge circuit for producing an electrical output proportional to changes in the impedance of the strain gage means,
   (g) selecting a material for said disc that is harder than the material from which said structural member is fabricated so that the surface of the bore is upset during said pressing step in order to reduce deformation of the disc itself.

2. The method of claims 1 wherein said step of providing at least one hole in the disc more specifically comprises providing at least two holes on a common diameter of the disc, and locating the strain gage means in the space between these holes.

3. The method of claim 2 wherein said locating of the strain gage means comprises arranging at least two strain gages symmetrically with respect to the common diameter.

4. The method of claim 1 wherein said valleys have a depth (d) such that the ratio (D)/(d) of the bore diameter (D) to the depth (d) of these valleys is in the range of 10-14 100.

5. The method of claims 4 wherein said teeth are equally spaced in the disc periphery and define a pitch in the range of 0.1D –0.05D.

6. The method of claim 4 wherein said disc has thickness (t) such that the ratio (D/t) is in the range of 5–10.

7. The method of claim 6 wherein said disc diameter (D+ ∆ D) is at least approximately equal to said bore diameter (D) +said tooth depth (d) so that ∆ D is at least approximately equal to d.

8. The method of claim 7 wherein said teeth are equally spaced in the disc periphery and define a pitch in the range of 0.1D–0.05D.

9. The method of claim 8 wherein said disc forming step includes forming said disc from a material harder than that of the member so that the surface of the bore is upset during said pressing step to reduce deformation of the disc itself.

10. The method of claim 9 wherein said step of providing at least one hole in the disc more specifically comprises providing at least two holes on a common diameter of the disc and locating the strain gage means in the space between these holes.

11. The method of claim 10 wherein said locating of the strain gage means comprises arranging at least two strain gages symmetrically with respect to the common diameter.

12. The method of claim 1 wherein said step of providing at least one hole in the disc more specifically comprises providing at least two holes on a common diameter of the disc and locating the strain gage means in the space between these holes.

13. The method of claim 12 wherein said locating of the strain gage means comprises arranging at least two strain gages symmetrically with respect to the common diameter.

14. A method for quantitatively determining changes in the internal strain within a structural member and comprising:
   (a) forming a cylindrical bore in the member, which bore has a diameter D,
   (b) providing a generally cylindrical disc of diameter D plus ∆ D, and forming circumaxially spaced teeth in disc periphery so that said teeth form valleys therebetween, said disc having flat parallel outer and inner faces so that the disc has a thickness t,
   (c) bonding electric strain gage means on at least the outer faces of the disc,
   (d) pressing the disc into the bore so that the strain gage means is located intermediate the inner and outer ends of the bore, and providing the strain gage means as input to a bridge circuit for producing an electrical output proportional to changes in the impedance of the strain gage means.

15. The method according to claim 14 wherein said disc thickness t bears a relationship to the bore diameter D such that the ratio (D/t) is in the range of 5 –10.

16. The method according to claim 14 wherein said disc is formed from a material that is harder than the material from which said structural member is fabricated so that the surface of the bore is upset during said pressing step in order to reduce the deformation of the disc material.

17. The method according to claim 14 further characterized by providing at least one hole in the disc so that the disc can be compressed on a disc diameter through the hole.

18. The method according to claim 14 wherein said locating of the strain gage means comprises arranging at least two strain gages symmetrically with respect to a common diameter, and wherein at least two holes are provided on said common diameter, said strain gages being arranged symmetrically with respect to the common diameter and in the space between said holes.

19. The method according to claim 14 wherein valleys between said peripheral teeth have a depth d such that the ratio of the bore diameter D to the depth d (D/d) is in the range of 10 –100.

20. The method according to claim 19 wherein said teeth are equally spaced in the disc periphery and define a pitch in the range of 0.1D–0.05D.

* * * * *

UNITED STATES PATENT AND TRADEMARK OFFICE
CERTIFICATE OF CORRECTION

PATENT NO.   : 4,936,149
DATED        : June 26, 1990
INVENTOR(S)  : Walter E. Jacobson It is certified that error appears in the above-identified patent and that said Letters Patent is hereby corrected as shown below:

Col. 3, line 17, "plus D" should be --plus $\Delta$ D--.

Col. 3, lines 28-30, "e) providing at least one hole in the disc so that the disc can be compressed on a disc diameter through the hole," should be deleted. (repeated)

Col. 3, line 52, "10-14 100" should be --10-100--.

Signed and Sealed this

Twenty-fourth Day of September, 1991

Attest:

HARRY F. MANBECK, JR.

Attesting Officer

Commissioner of Patents and Trademarks